March 16, 1965   J. L. GIOVINAZZO   3,173,668
ADJUSTABLE OVERLOAD BRACKET FOR VEHICLES
Filed May 17, 1962
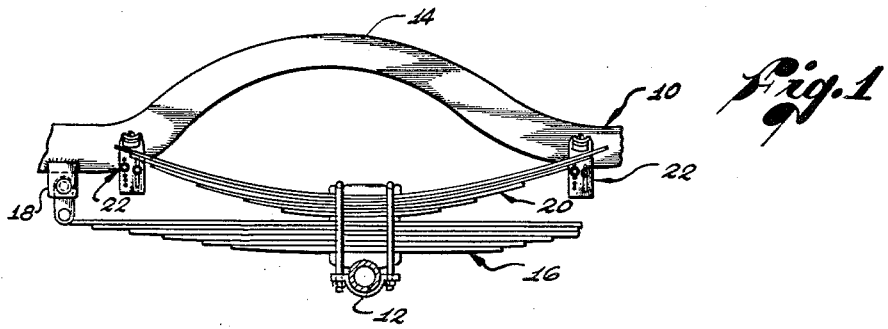
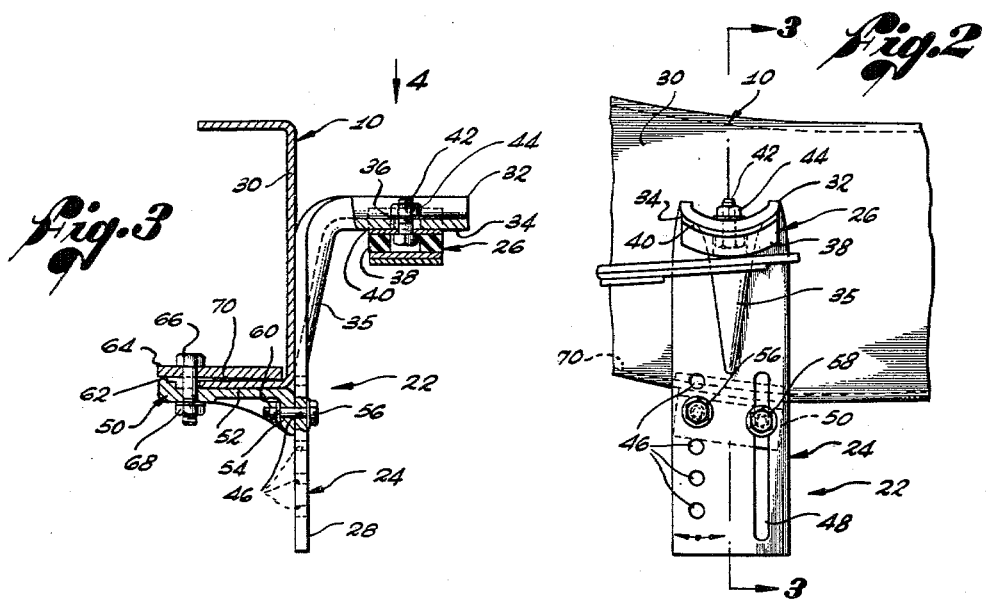
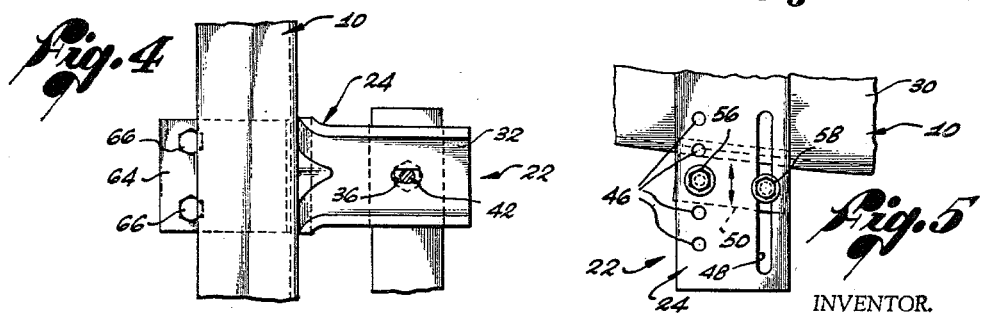
INVENTOR.
JOE L. GIOVINAZZO
BY 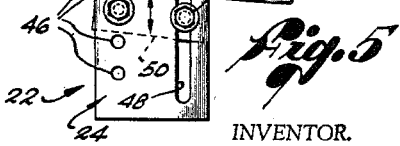
ATTORNEY

United States Patent Office 3,173,668
Patented Mar. 16, 1965

3,173,668
ADJUSTABLE OVERLOAD BRACKET FOR VEHICLES
Joe L. Giovinazzo, Los Angeles, Calif., assignor to Cambria Spring Company, Los Angeles, Calif., a corporation of California
Filed May 17, 1962, Ser. No. 195,597
5 Claims. (Cl. 267—45)

This invention relates generally to spring suspension systems for heavy vehicles, such as trucks and the like, and, particularly, to an improved adjustable overload bracket for spring suspension systems of this kind.

The rear spring suspension systems of trucks and other heavy vehicles frequently comprise a pair of main leaf springs and a pair of auxiliary or overload leaf springs. The ends of the main springs are attached to spring hangers which are anchored directly to the vehicle frame. The ends of the overload springs, on the other hand, are not directly connected to the vehicle frame but, rather, are located for engagement with overload brackets attached to the vehicle frame. The ends of the overload springs engage these brackets only after the main springs have been deflected a predetermined distance. Thus, the overload springs do not become effective to reinforce the main springs until the vehicle is sufficiently heavily loaded to engage the overload springs with their brackets. Accordingly, a vehicle equipped with this kind of spring system has a relatively light spring action when lightly loaded, as is necessary to provide the vehicle with a softly cushioned ride under such light load conditions, and a relatively stiff spring action when heavily loaded, as is required to support the heavy vehicle load.

Some existing overload brackets for use in spring systems of this kind are permanently riveted or bolted to the vehicle frame. These brackets are difficult to install and once installed cannot be adjusted. Other existing overload brackets, and the overload brackets of this invention, are clamped to the lower flanges of the vehicle frame. This latter type of bracket is relatively easy to install and, after installation, can be adjusted lengthwise of the frame by simply loosening its frame clamp.

The existing overload brackets of this kind are deficient, however, in that they do not accommodate any angular adjustment of the bracket with respect to the vehicle frame as is necessary to attain proper positioning of any one overload bracket configuration on different vehicles. Thus, a vehicle frame curves up and over the rear vehicle axle with a curvature that varies from one vehicle to another. This curved portion of the frame is also frequently tapered and the amount of this taper differs from one vehicle to another. As a result, an overload bracket which has no provision for angular adjustment will assume one angular position when clamped to the lower frame flange of one vehicle and another angular position when clamped to the lower frame flange of another vehicle. As a result, most existing overload brackets of this kind must be designed for one particular vehicle or, at best, for a very limited number of different vehicles.

In addition to this angular adjustment of the overload bracket with respect to the vehicle frame, the ideal overload bracket also accommodates adjustment of the spacing between the spring seat on the bracket and the overload spring for any given loading of the vehicle so as to adjust the deflection of the main vehicle springs required to render the overload springs effective. The overload bracket is also preferably adjustable to accommodate the varying widths of overload spring leaves which are used on different vehicles.

A general object of this invention is to provide an improved adjustable overload bracket for vehicle spring suspension systems of the character described.

Another object of the invention is to provide an overload bracket of the character described which can be angularly adjusted with respect to the vehicle frame on which it is mounted, whereby to accommodate attachment of the bracket to a great number of different vehicles.

A further object of the invention is to provide an overload bracket of the character described which is adjustable to vary the spacing between the spring seat on the bracket and the overload spring for any given loading of the vehicle, whereby to adjust the deflection of the main vehicle springs required to render the overload springs effective to reinforce the main springs, and which bracket is further adjustable to accommodate different widths of vehicle overload springs.

A still further object of the invention is to provide an adjustable overload bracket of the character described which is relatively simple in construction, economical to manufacture, easy to install, and otherwise ideally suited to its intended purposes.

Other objects, advantages, and features of the invention will become readily apparent as the description proceeds.

A presently preferred embodiment of the invention will now be described in detail by reference to the attached drawing, wherein:

FIG. 1 is a view in side elevation of one rear spring assembly of a vehicle showing a pair of the present overload brackets mounted on the vehicle frame for engagement by the ends of the vehicle overload spring;

FIG. 2 is an enlargement of one of the overload brackets in FIG. 1;

FIG. 3 is a section taken on line 3—3 in FIG. 2;

FIG. 4 is a view looking in the direction of the arrow 4 in FIG. 3; and

FIG. 5 shows the illustrated overload brackets in adjusted position.

Referring first to FIG. 1 of this drawing, the numeral 10 denotes the rear end portion of a conventional truck frame. This frame curves up and over the rear axle 12 of the truck, in the well-known way. As preliminary discussed, and as shown in the drawing, the curved portion 14 of the frame also decreases in width toward the peak of the curved portion, providing the latter with a tapered configuration.

Attached at its center to the rear axle 12 is a main leaf spring 16. The ends of this main spring are commonly attached to the vehicle frame 10 by spring hangers 18 (only one shown). Also attached at its center to the axle 12, and disposed over the main spring 16, is the overload leaf spring 20 of the vehicle. As described earlier, and as illustrated in the drawing, the ends of this overload spring are not directly attached to the vehicle frame but, rather, are located to engage overload brackets 22 attached to the frame after the main spring 16 has deflected a predetermined distance. The overload brackets 22 comprise the subject matter of this invention.

One of these overload brackets will now be described in detail by reference to FIGS. 2–5. Referring to these latter figures, the overload bracket 22 will be seen to comprise a generally L-shaped supporting bracket 24 which carries an overload-spring-engaging seat or pad 26. The supporting bracket 24 comprises a normally vertical mounting plate 28 adapted to seat against the outer surface of the web 30 of the vehicle frame 10. The upper end of this plate is turned outwardly at right angles to the plate 28 proper to form a spring pad supporting arm 32. This arm has been illustrated as being generally circularly curved in cross section, affording the arm with a lower convex seating surface 34, and the mounting plate 28 has been shown as having a rib 35, all to lend rigidity to the supporting bracket 24.

Formed in and extending lengthwise of the pad supporting arm 32 is a slot 36. The overload-spring-engaging pad 26 comprises a lower resilient or elastic cushion 38 which is bonded to a curved metal backing plate 40. The curvature of the upper surface of this backing plate matches the curvature of the under seating surface 34 of the seat supporting arm 32. The spring seat 26 is secured to the supporting arm 32 by means of a bolt 42. The head of this bolt is recessed in the cushion 38 and the shank of the bolt extends through the metal backing plate 40 of the spring seat and through the slot 36 in the supporting arm 32. A nut 44 is threaded on this bolt, above the supporting arm 32, for securely clamping the spring seat 26 to the supporting arm 32 with the upper curved surface of the seat backing plate 40 engaging the curved seating surface 34 of the supporting arm 32. It is obvious that the spring seat 26 may be adjusted lengthwise of the supporting arm 32, to the extent permitted by the slot 36 in the arm, by simply loosening the nut 44. The complementary engaging curved surfaces on the supporting arm 32 and the spring seat 26 retain the latter in a fixed angular position with respect to the arm.

Extending through the vertical plate 28 of the supporting bracket 24, adjacent one edge of the plate, are a series of holes 46 which are spaced lengthwise of the plate. Extending through the plate 28, adjacent its opposite edge, is a slot 48 extending lengthwise of the plate.

Indicated at 50 is a generally L-shaped clamping bracket having a normally horizontal flange 52 and a normally vertical flange 54. The vertical flange of the clamping bracket 50 seats against the inner surface of the supporting bracket plate 28.

The clamping bracket 50 is secured to the supporting bracket 24 by means of bolts 56 and 58 and nuts 60 on these bolts. Bolt 56 extends through one of the holes 46 in the supporting bracket plate 28 and through an aligned hole in the vertical clamping bracket flange 54. Bolt 58 extends through the slot 48 in the supporting bracket plate 28 and through an aligned hole in the clamping bracket flange 54. The nuts 60 are tightened on these bolts to firmly attach the clamping bracket to the supporting bracket.

At the end of the horizontal flange 52 of the clamping bracket 50, remote from the supporting bracket 24, is a fulcrum 62. Seating adjacent one edge on this fulcrum is a clamping plate 64. Clamping plate 64 is secured to the clamping bracket 50 by means of bolts 66 which extend through aligned holes in the clamping plate and clamping bracket. Nuts 68 are threaded on these latter bolts for drawing the clamping plate 64 toward the clamping bracket 50, the clamping plate rocking on the fulcrum 62 as the nuts 68 are tightened.

When installing the illustrated overload bracket 22, the horizontal flange 52 of the clamping bracket 50 is placed against the underside of the lower flange 70 of the vehicle frame 10 with the clamping plate 64 engaging the upper surface of this frame flange. When the clamping nuts 68 are tightened, the clamping plate 64 is rocked on the clamping bracket fulcrum 62 into forced contact with the frame flange 70, thereby rigidly clamping the overload bracket 22 to the vehicle frame 10. In practice, the spacing between the inner surface of the supporting bracket plate 28 and the fulcrum 62 is made sufficient to accommodate the maximum width of frame flange 70 found on any vehicle.

Returning now again to FIG. 1, it will be observed that a pair of the overload brackets 22 are mounted on (each side of) the vehicle, one adjacent each end of the overload spring 20. In this latter figure, it will be seen that the vehicle frame 10 both curves and tapers at the two places where the overload brackets are attached. As a result, the lower flange 70 of the vehicle frame 10 is inclined at some angle to the horizontal at these places of attachment, as shown best in FIG. 5. If the supporting bracket 24 of each of the overload brackets were rigidly and permanently attached to the clamping brackets 50, therefore, the supporting brackets 24 would be inclined from the vertical. This would improperly locate the overload-spring-engaging pads 38 with respect to the adjacent ends of the overload spring.

The construction of the present improved overload bracket is such as to permit the supporting brackets 24 to be adjusted to vertical or other desired angular positions, after the clamping brackets 50 have been attached to the vehicle frame 10, by simply loosening the nuts 60 on the bolts 56 and 58. Once these bolts are loosened, it is obvious that the supporting brackets 24 may be angularly adjusted to the proper angular positions thereof regardless of the angle of the lower frame flange 70. Adjustment of the spacing between the overload spring seats 26 and the ends of the overload spring 20, under any given loading condition of the vehicle, is accomplished by removing the bolts 56 of the spring seats which pass through the holes 46 in the bracket plates 28 and loosening the bolts 58 sufficiently to permit the supporting brackets 24 to be adjusted up or down (FIG. 5). After the supporting brackets are located in their new vertical positions, the bolts 56 are inserted through the holes 46 in the supporting bracket plates 28 which are most nearly aligned with the corresponding holes in the clamping plate flanges 54. After the supporting brackets are then properly angularly positioned, the nuts 60 are tightened on the bolts 56 and 58 to firmly secure the supporting brackets in position. As a final adjustment, the nuts 44 which secure the spring pads 26 to the supporting arms 32 are loosened and the pads are shifted lengthwise of the supporting arms to center them with respect to their respective ends of the overload spring. The nuts 44 are then retightened to secure the pads in position on the supporting arms.

It is evident, therefore, that the invention herein described and illustrated is fully capable of attaining the several objects and advantages preliminary set forth.

While a presently preferred embodiment of the invention has been disclosed for illustrative purposes, it is obvious that numerous modifications in the design and arrangement of parts of the invention are possible within the spirit and scope of the following claims.

What is claimed is:

1. An overload bracket for an automotive vehicle, comprising:
    a first bracket member including an elongate plate to seat against the side of the vehicle frame and a transverse spring seat at one end of and extending beyond one side of said plate,
    a second bracket member including a first flange seating against the other side of said plate and a second flange with a surface disposed in a plane substantially normal to said other side of the plate for seating against the underside of said frame,
    means for securing said second flange to the vehicle frame,
    said plate having a series of holes arranged in a longitudinal row adjacent one edge of the plate and selectively alignable with a first hole in said first flange and said plate having a longitudinal slot adjacent its other edge aligned with a second hole in said latter flange, and
    means securing said plate to said first flange including a bolt extending through one hole in said row and through said first hole in said first flange and a second bolt extending through said slot and said second hole in said first flange.

2. An overload bracket for an automotive vehicle, comprising:
    a first generally L-shaped bracket member including an elongate substantially vertical plate for seating against one side of the vehicle frame and a transverse spring seat at the upper end of and extending beyond one side of said plate;
    a second generally L-shaped bracket member including a substantially vertical flange seating against the other side of said plate intermediate the ends of the plate and a substantially horizontal flange extending substantially normal to said plate from the upper edge of said substantially vertical flange;

said substantially horizontal flange having an upwardly facing surface for seating against the undersurface of said vehicle frame and said substantially vertical flange extending downwardly from said substantially horizontal flange;

means including fastening means extending through said plate and said substantially vertical, downwardly extending flange adjustably securing said bracket members together;

a clamping plate overlying said surface of said substantially horizontal flange; and clamping means joining said clamping plate and substantially horizontal flange.

3. An overload bracket for an automotive vehicle, comprising:

a generally L-shaped bracket member including a plate for seating against one side of the vehicle frame and a transverse spring seat support at one end of and extending beyond one side of said plate;

said seat support having a seating surface facing the other end of said plate, which surface is convexly curved about an axis approximately normal to the plane of said plate;

a spring seat pad having a concave seating surface seating against said convex seating surface;

means including a fastener extending through a longitudinal slot in said seat support pad to said seat support; and means for securing said bracket member to the vehicle frame.

4. The subject matter of claim 3 wherein:

said spring seat pad comprises a resilient pad and a curved metal backing plate bonded to said resilient pad and engaging said seat support.

5. The subject matter of claim 3 wherein:

said one end of said plate is bent at a right angle to form said seat support, and said seat support is laterally curved for reinforcement and to form said convex seating surface on the seat support.

References Cited in the file of this patent
UNITED STATES PATENTS

| | | |
|---|---|---|
| 1,234,681 | McIntyre | July 24, 1917 |
| 1,265,825 | Sprague | May 14, 1918 |
| 1,524,908 | Brewster | Feb. 3, 1925 |
| 1,959,118 | Uffelman | May 15, 1934 |
| 2,298,372 | Ham | Oct. 13, 1942 |
| 2,705,140 | Roehrig | Mar. 29, 1952 |
| 2,791,419 | Whalen | May 7, 1957 |